United States Patent
Spriggs et al.

(10) Patent No.: US 10,699,249 B2
(45) Date of Patent: Jun. 30, 2020

(54) POINT-OF-CONTACT DATABASE INFORMATION INTEGRATION SYSTEM

(71) Applicant: Branch Banking and Trust Company, Winston-Salem, NC (US)

(72) Inventors: Matthew T. Spriggs, Cary, NC (US); Michael Shade, Apex, NC (US); Patricia Kinney, Cary, NC (US)

(73) Assignee: Truist Bank, Charlotte, NC (US)

( * ) Notice: Subject to any disclaimer, the term of this patent is extended or adjusted under 35 U.S.C. 154(b) by 573 days.

(21) Appl. No.: 15/168,916

(22) Filed: May 31, 2016

(65) Prior Publication Data

US 2016/0350723 A1 Dec. 1, 2016

Related U.S. Application Data

(60) Provisional application No. 62/167,712, filed on May 28, 2015.

(51) Int. Cl.
| | |
|---|---|
| *G06Q 10/10* | (2012.01) |
| *G06F 3/0482* | (2013.01) |
| *G06F 16/29* | (2019.01) |
| *G06F 16/9535* | (2019.01) |
| *H04M 3/51* | (2006.01) |
| *H04L 29/08* | (2006.01) |

(52) U.S. Cl.
CPC ....... *G06Q 10/1095* (2013.01); *G06F 3/0482* (2013.01); *G06F 16/29* (2019.01); *G06F 16/9535* (2019.01); *H04M 3/5183* (2013.01); *H04L 67/18* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,916,858 B1* | 3/2011 | Heller | H04M 3/523 379/265.12 |
| 2003/0220835 A1* | 11/2003 | Barnes, Jr. | H04M 1/72519 705/14.36 |
| 2014/0233719 A1* | 8/2014 | Vymenets | H04M 3/5183 379/265.03 |

(Continued)

OTHER PUBLICATIONS

B. J. Rhodes et al., Just-in-time information retrieval agents, IBM Systems Journal, vol. 39, Nos. 3&4, 2000.*

(Continued)

*Primary Examiner* — Christine M Behncke
*Assistant Examiner* — Matthew H Divelbiss
(74) *Attorney, Agent, or Firm* — Kilpatrick Townsend & Stockton LLP

(57) ABSTRACT

An integration system may be communicatively coupled to resource systems, including a user-information system and a provider-information system. The integration system may determine, based on geographical information from the user a list of available agents of a provider of an account held by the user. The integration system may select a point-of-contact from the list of available agents and authorize the point-of-contact to access secure information associated with the account. The integration system may also authorize the user to access secure information associated with the provider, including contact information and availability information.

22 Claims, 11 Drawing Sheets

(56) References Cited

U.S. PATENT DOCUMENTS

| | | | | |
|---|---|---|---|---|
| 2014/0307863 A1* | 10/2014 | Snyder | ............... | H04M 3/5233 |
| | | | | 379/265.09 |
| 2015/0052260 A1* | 2/2015 | Bott | ...................... | H04W 4/16 |
| | | | | 709/232 |
| 2015/0117630 A1* | 4/2015 | Warnick | ............. | H04M 3/5183 |
| | | | | 379/265.09 |
| 2015/0117631 A1* | 4/2015 | Tuchman | ............ | H04M 3/5233 |
| | | | | 379/265.09 |
| 2015/0379562 A1* | 12/2015 | Spievak | ............. | H04M 3/5158 |
| | | | | 379/265.09 |

OTHER PUBLICATIONS

Alisa Devlic et al., Location-Aware Information Services using User Profile Matching, 8th International Conference on Telecommunications—ConTEL 2005 ISBN: 953-184-081-4, Jun. 15-17, 2005, Zagreb, Croatia.*

Gaurav Tewari et al., Personalized location-based brokering using an agent-based intermediary architecture, Decision Support Systems 34 (2002) 127-137.*

* cited by examiner

POINT-OF-CONTACT DATABASE INFORMATION INTEGRATION SYSTEM

CROSS-REFERENCE TO RELATED APPLICATION

This claims priority to U.S. Provisional Application Ser. No. 62/167,712, filed May 28, 2015 and titled "Web-Based Integration System for Establishing a Point-of-contact," the contents of which are incorporated herein by reference.

TECHNICAL FIELD

The present disclosure relates to database integration systems, and more particularly, though not necessarily exclusively, to database associations in an integration system for multi-party access to secure information.

BACKGROUND

Web-based platforms may provide users the ability to access secure and personal information from a user device connected to a web network. For many web-based platforms, a user's secure information may be accessible to the user at any time. In addition, for many web-based platforms, the user may be able to manage or manipulate the information without any direct human intervention or human oversight from the web-based platform provider. The lack of human intervention and oversight provided by the platform may be a convenience to the user and allow the user flexibility and autonomy over the user's own secure information. But, when problems arise, the lack of human intervention and oversight may have an opposite effect. But, the platform architecture may not be designed to allow a user access to certain secure information of the provider that may be necessary to resolve the problem.

SUMMARY

In some aspects, an integration system may include a processor communicatively coupled to multiple databases. The databases may include at least a first database and a second database. The first database may include secure user information associated with a user identifier that corresponds to a user. The second database may include secure agent information associated with agent identifiers that correspond to agents of a provider of one or more accounts held by the user. The integration system may also include a memory accessible to the processor and including instructions that may be executed by the processor to cause the processor to construct a list of agents within a threshold radius of a physical location associated with the user identifier by retrieving user geographical information and account information associated with the user identifier stored in the first database. The user geographical information may correspond to the physical location. The account information may correspond to at least one account of the one or more accounts held by the user and including an account type corresponding to the one account. The instructions may also be executed by the processor to cause the processor to construct the list of agents within the threshold radius by retrieving agent geographical information associated with one or more of the agent identifiers in the second database. The instructions may also be executed by the processor to cause the processor to construct the list of agents within the threshold radius by comparing the user geographical information to the agent geographical information to determine the list of agents within the threshold radius of the physical location.

In certain aspects, the instructions may also be executed by the processor to cause the processor to filter the list of agents to generate a list of available agents that are eligible to be a point-of-contact by comparing the account type and the job descriptions to determine the agent identifiers associated with the job descriptions that are compatible with the account type. The instructions may also be executed by the processor to cause the processor to determine a point-of-contact from the list of available agents. The instructions may also be executed by the processor to cause the processor to associate the agent identifier corresponding to the point-of-contact with the user identifier corresponding to the user in one or more of the databases. The instructions may also be executed by the processor to cause the processor to, in response to a request from the user to access the secure agent information, retrieve the agent identifier corresponding to the point-of-contact from the one or more databases. The instructions may also be executed by the processor to cause the processor to, in response to a request from the user to access the secure agent information, search for a matching agent identifier in the second database to identify the secure agent information requested by the user.

In some aspects, a method may include receiving, by an integration system, authentication information from a user device via a network. The method may also include determining, by a processor of the integration system, a user identifier associated with the authentication information in a first database communicatively coupled to the processor. The user identifier may correspond to a user of the user device. The method may also include retrieving, by the processor, user geographical information associated with the user identifier in the first database. The user geographical information may correspond to a physical location associated with the user. The method may also include retrieving, by the processor, account information associated with the user identifier stored in the first database. The account information may correspond to an account held by the user and including an account type corresponding to the account. The method may also include retrieving, by the process, agent geographical information associated with one or more agent identifiers in the second database. The method may also include comparing the user geographical information to the agent geographical information to determine a list of agents within a threshold radius of the physical location associated with the user.

In certain aspects, the method may also include filtering the list of agents to generate a list of available agents that are eligible to be a point of contact by comparing the account type and the job descriptions to determine agent identifiers associated with the job descriptions that are compatible with the account type. The method may also include determining a point-of-contact from the list of available agents. The method may also include associating the agent identifier corresponding to the point-of-contact with the user identifier corresponding to the user in one or more databases. The method may also include, in response to a request from the user to access secure agent information stored in the second database, retrieving the agent identifier corresponding to the point-of-contact from the one or more databases. The method may also include, in response to a request from the user to access secure agent information stored in the second database, searching for a matching agent identifier in the second database to identify the secure agent information requested by the user.

In some aspects, a non-transitory computer-readable medium may include program code executable by a processor of an integration system to cause the processor to construct a list of agents within a threshold radius of a physical location associated with a user identifier by retrieving user geographical information and account information associated with the user identifier stored in a first database. The user geographical information may correspond to the physical location. The account information may correspond to an account held by the user and including an account type corresponding to the account. The program code may also be executed by a processor of an integration system to cause the processor to construct a list of agents within a threshold radius of a physical location associated with a user identifier by retrieving agent geographical information associated with one or more of the agent identifiers in the second database. The program code may also be executed by a processor of an integration system to cause the processor to construct a list of agents within a threshold radius of a physical location associated with a user identifier by comparing the user geographical information to the agent geographical information to determine the list of agents within the threshold radius of the physical location.

In certain aspects, the program code may also be executed by a processor of an integration system to cause the processor to filter the list of agents to generate a list of available agents that are eligible to be a point-of-contact by comparing the account type and the job descriptions to determine the agent identifiers associated with the job descriptions that are compatible with the account type. In certain aspects, the program code may also be executed by a processor of an integration system to cause the processor to determine a point-of-contact from the list of available agents. In certain aspects, the program code may also be executable by a processor of an integration system to cause the processor to associate the agent identifier corresponding to the point-of-contact with the user identifier corresponding to the user in one or more databases. In certain aspects, the program code may also be executed by a processor of an integration system to cause the processor to, in response to a request from the user to access the secure agent information, retrieve the agent identifier corresponding to the point-of-contact from the one or more databases. In certain aspects, the program code may also be executed by a processor of an integration system to cause the processor to, in response to a request from the user to access the secure agent information, search for a matching agent identifier in the second database to identify the secure agent information requested by the user.

DETAILED DESCRIPTION

Figure 1:
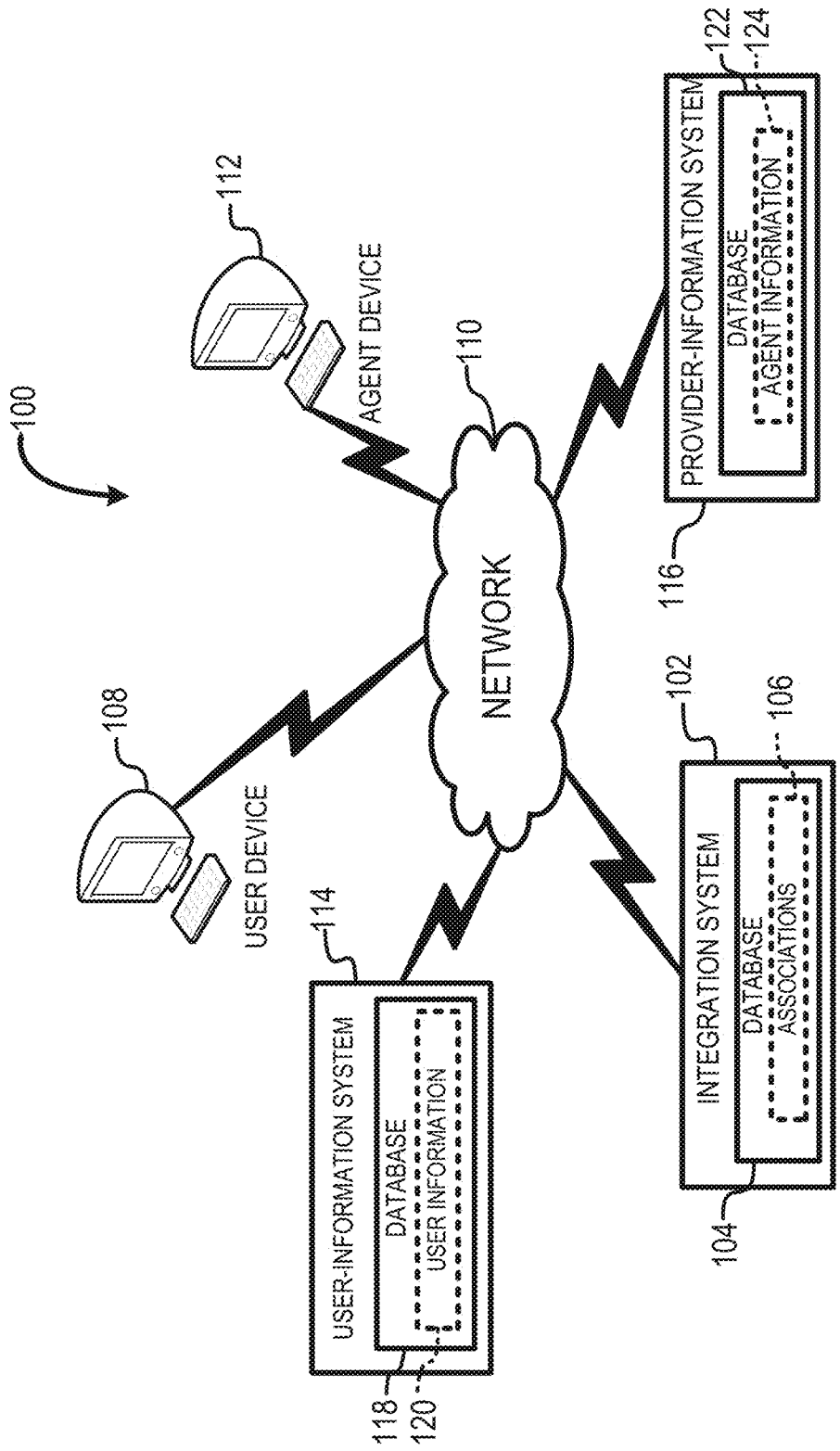
FIG. 1 is a block diagram of a network environment including an integration system according to some aspects of the present disclosure.

Certain aspects and examples of the present disclosure relate to integrating information for mutual accessibility of secure information corresponding to two or more parties and stored in disparate system databases by automatically associating identifiers corresponding to the parties in database operable as a gateway to the secure information. The link between the user and the point-of-contact may allow the user to access certain secure agent information, such as the availability information of the agent to schedule an interaction between the user and the agent. The link may also allow the agent to access certain secure user information, such as account information corresponding to the account held by the user. A first database may include both secure and unsecured information corresponding to a user and a second database may include secure and unsecured information corresponding to a provider of one or more accounts held by the user. An agent of the provider may be automatically associated with the user via the corresponding identifiers using geographical information of the user and the agent associated with the identifiers in the respective databases. In some aspects, the geographical information of the user may correspond to a physical location and may be used to determine the agent identifier by identifying agent identifiers associated with geographical information within a specified radius of the physical location.

In some aspects, the integration system may determine agents available to serve as a point-of-contact from agents within the specified radius for the user by retrieving and comparing secure information associated with the user identifier and job information associated with the agent identifiers of the agents. For example, the integration system may retrieve an account type associated with secure account information and determine one or more agents within the specified radius having a job description compatible with the account type. In some aspects, the integration system may subsequently filter a list of available to determine a point-of-contact by identifying the agent identifier linked with the fewest number of user identifiers in the database.

An integration system according to some aspects may be an improvement over conventional systems that lack an integration component for integrating separate network resources to connect the user to the agent in the real world. For example, in conventional systems, some network resources may be accessible only to the user and not to the agent. Similarly, other network resources may be accessible only to the agent and not to the user. For network-based relationships, integration of the network components may not be necessary. But, real-world relationships may benefit from both the user and the agent having access to certain secure information of the other party. An integration system according to some aspects may allow information from each network resource to be mutually accessible to both the user and the agent and, in some aspects, may facilitate a real-world relationship between the user and the agent.

An integration system according to some aspects of the present disclosure may further limit the available agents to serve as a point-of-contact for the user based on the user information and the agent information stored in the resource systems communicatively coupled to the integration system. For example, a resource system may include agent information that may allow the system to access information associated with agents of the provider, including, for example, agents' locations and job responsibilities. The system may construct a list of available agents by limiting the list to only those providers within a specified proximity of the user based on the agents' locations and geographical information related to the user. The available agents may be alternatively or further limited to a list of only those agents with specialized skills or responsibilities associated with provider goods (e.g. accounts). In some aspects, the integration system may also allow the user to manually select additional agents as points-of-contact by searching for agents using the agents' names or locations.

A relationship between the user and a provider via the agent may be of particular importance where it relates to sensitive or secure user information. For example, the user may utilize web-based platforms to access and manage sensitive financial information. Questions may arise with respect to the user's finances (e.g., determining a savings plan for the user in light of the user's income and spending habits). Employees staffing a call center may not be appropriately trained to answer such questions or have the appropriate levels of clearance to access the necessary information to assist the user. Further, the user may not be comfortable seeking answers to such personal questions from an unknown employee servicing a call center. Instead, the user may prefer to have a point-of-contact that is local to the user and accessible for face-to-face interaction or a point-of-contact that is able to provide specialized services or skills to the user. A local point-of-contact may provide a personal relationship and experience between the user and the provider that is lacking in web-based interactions. The personal relationship between the user and a local point-of-contact may allow the provider to have personal knowledge of the user and the user's personal information. Similarly, a personal relationship between the user and a specialized point-of-contact may allow the agent to have a particularized knowledge of and perspective on the user and the user's information. The availability of these agents may result in a higher level of customer service not otherwise available to users of web-based platforms.

Various aspects of the present disclosure may be implemented in various environments. FIG. 1 is a block diagram depicting a network environment 100 including an integration system 102 according to some aspects of the present disclosure. The integration system 102 includes a database 104 having associations 106 stored in one or more memory locations of the database 104 to facilitate multi-party access to secure information of each party. The associations 106 may correspond to links or other associations between identifiers corresponding to the parties that may be called or referenced by a processor of the integration system 102 to authorize each party to view certain secure information of the other party.

In some aspects, the parties may include a user and an agent of a provider of one or more accounts held by the user. The integration system 102 is communicatively coupled to a user device 108 of the user via a network 110, such as the Internet. The user may use the user device 108 to access the integration system 102 for authorization to access secure information of the provider. The integration system 102 is also communicatively coupled to an agent device 112 via the network 110. The agent may use the agent device 112 to access the integration system 102 for authorization to access secure information of the user. The user device 108 may represent one or more user devices communicatively coupled to the integration system 102 via the network 110. Similarly, the agent device 112 may represent one or more agent devices communicatively coupled to the integration system 102 via the network 110. The user device 108 and the agent device 112 may include a computing device, such as a laptop, mobile phone, desktop computer, personal digital assistant, tablet, etc., that may display content in a web browser or other user interface. In some aspects, the integration system 102 may receive requests and commands from the user device 108 or the agent device 112 via the network 110 and configure the user interfaces to be provided to the user device 108 or the agent device 112, respectively, in response to the requests and commands.

In some aspects, the network 110 may also include a telephone network. For example, the user may connect to the integration system 102 using interactive voice response ("IVR"). The IVR may include a telephone system operated by the provider and communicatively coupled to a telephone network (e.g., a public switched telephone network ("PSTN"), a Plain Old Telephone Service ("POTS"), a cellular telephone network, etc.) via a switch. The IVR may allow a user to access the system by voice and dual-tone multi-frequency signaling ("DMTF") via a keyboard or keypad of the user device 108 or the agent device 112.

The integration system 102 may be communicatively coupled to multiple resource systems via the network 110. The resource systems include a user-information system 114 and a provider-information system 116. The user-information system 114 includes a database 118 that includes user information 120 corresponding to the user. The database 118 may include user information 120 corresponding to multiple users holding an account. The user information 120 may include secure information accessible to the user via the user device 108 subsequent to an authentication of the user to view the information. The secure user information stored in the database 118 of the user-information system 114 may also be accessible to an agent linked to the user via an association 106 in the database 104 of the integration system 102. The integration system 102 may link the agent to the user as a point-of-contact and authorize the agent to access the secure user information via the agent device 112.

The provider-information system 116 includes a database 122 that includes agent information 124 corresponding to an agent. The database 122 may include agent information 124 for multiple agents of the provider. The agents may be employees, contractors, or other human representatives of the provider. The agent information 124 may include secure agent information that may be accessible to the agent from the agent device 112, but that may not be accessible to the user an association 106 between the user and the agent stored in the database 104 of the integration system 102.

Although the user-information system 114 and the provider-information system 116 are described as distinct or separate systems from the integration system 102, the systems 114, 116 may be included as subsystems of the integration system 102, or as subsystems of a single system, without departing from the scope of the present disclosure. Similarly, some aspects, one or more of the systems 114, 116 or the databases 118, 122 may be integrated. The databases 118, 122 of the systems 114, 116, respectively, may each represent one or multiple database devices having memory locations for storing information.

In some aspects, the integration system 102, the user-information system 114, and the provider-information system 116 may alternatively or additionally be communicatively coupled via the enterprise service bus in addition, or alternative to, being communicatively coupled via the network 110 of FIG. 1. For example, the user device 108 of FIG. 1 may interact with the integration system 102 and the user-information system 114 via the network, but the integration system 102 and the user-information system 114 may separately communicate via the enterprise service bus.

Figure 2:
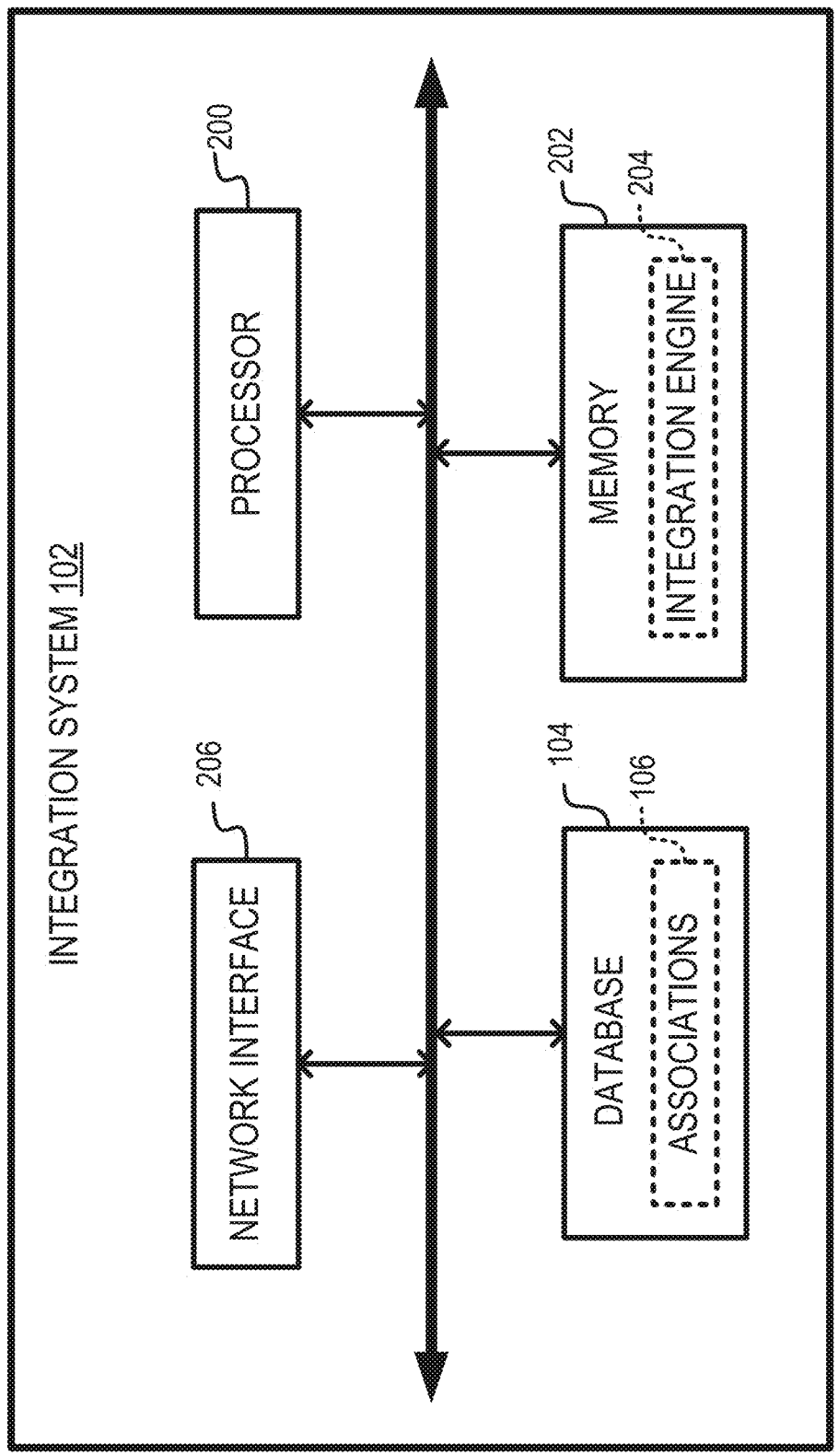
FIG. 2 is a block diagram of the integration system database of FIG. 1 according to some aspects of the present disclosure.

FIG. 2 is a block diagram of the integration system 102 according to some aspects of the present disclosure. The integration system 102 includes a processor 200 and a memory 202 coupled to the processor via a bus. The processor 200 may execute instructions stored in the memory 202 to perform the operations of the integration system 102. The processor 200 may include a single processing device or multiple processing devise. Non-limiting examples of the processor 200 include a field-programmable gate array, an application-specific integrated circuit ("ASIC"), and a microprocessor. The memory 202 includes a storage device that retains information when powered off. Non-limiting examples of the memory 202 include electrically erasable and programmable read-only memory, a flash memory, or any other type of non-volatile memory.

In some examples, at least a portion of the memory 202 may include a computer-readable medium from which the processor 200 can read instructions of the memory 202. A computer-readable medium may include electrical, optical, magnetic, or other storage devices capable of providing the processor 200 with computer-readable instructions or other program code. Non-limiting examples of a computer-readable medium include magnetic disks, memory chips, read-only memory, random-access memory, an ASIC, a configured processor, optical storage, or any other medium from which the processor 200 may access and execute instructions. The instructions may include processor-specific instructions generated by a compiler or an interpreter from code written in any suitable computer-programming language, including, for example, C, C++, C#, COBOL, Java, etc. The instructions include an application, such as integration engine 204, including one or more algorithms for determining a point-of-contact for a user, linking the user and the point-of-contact by associating identifiers corresponding to the user and the point-of-contact in a database, and using the link to authorize mutual accessibility of secure user information and secure agent information to both the user and the point-of-contact. In some aspects, the integration engine 204 may also cause the processor 200 to generate one or more user interfaces for receiving commands and requests from the user device 108 or the agent device 112 and for displaying information stored in a database accessible to the integration system (e.g., databases 118, 122).

In some aspects, the integration engine 204 may include a matching algorithm. The matching algorithm may include approximate string matching instructions, string searching instructions, pattern matching, image matching, or other computing means for searching for or comparing stored information in a database to determine a match.

The integration system 102 also includes the database 104. The database 104 may include one or more memory locations to store and associate information for authorizing the user and the agent to mutually access secure user information and secure agent information stored in databases of systems communicatively coupled to the integration system 102. The database 104 may store associations 106 between users holding accounts and agents of providers of the accounts. For example, the integration engine 204 may cause the processor 200 to retrieve a user identifier corresponding to the user from the database 118 of the user-information system 114 of FIG. 1 and an agent identifier corresponding to the agent determined as the point-of-contact for the user. The integration engine 204 may cause the processor 200 to store the user identifier and the agent identifier in the database 104 in a manner that links, or otherwise associates, the identifiers.

A network interface 206 is also coupled to the processor 200 and the memory 202 via the bus. The network interface 206 may include a network card or other device communicatively coupled to the network 110 to allow the user device 108 or the agent device 112 to access the integration system 102 for authorization to access the secure user information and the secure agent information. In some aspects, the network interface 206 may transmit user interfaces generated by the processor 200 to the user device 108 via the network 110.

Figure 3:
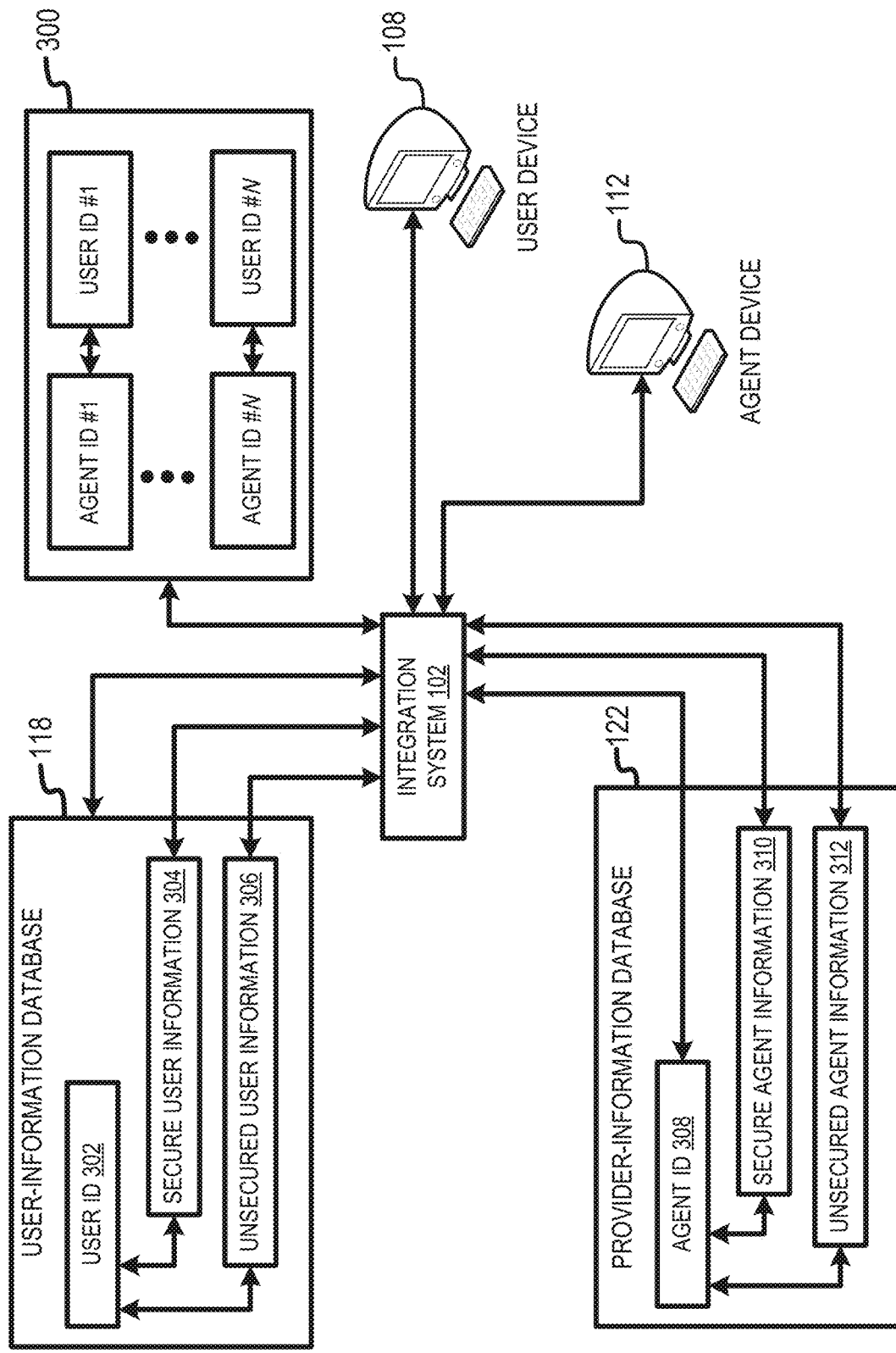
FIG. 3 is a block diagram depicting dataflow through the integration system of FIG. 1 according to some aspects of the present disclosure.

FIG. 3 is a block diagram depicting dataflow through the integration system 102 according to some aspects of the present disclosure. The dataflow is described with respect to the user device 108, the agent device 112, the user-information database 118, and the provider-information database 122 of FIG. 3, though other implementations are possible without departing from the scope of the present disclosure. The integration system 102 may operate as the gateway for transmitting data from the user-information database 118 and the provider-information database 122 to the user device 108 and the agent device 112 based associations of identifiers corresponding to the users and the agents stored in a table 300 of a database. In some aspects, the table 300 may be located in the database 104 of the integration system 102 described in FIGS. 1 and 2. In other aspects, the table 300 may be included in any database accessible to the integration system 102 (e.g., the user-information database 118, the provider-information database 122).

The table 300 may be stored in a relational database and have a column of user identifiers linked to, or otherwise associated with, a column of agent identifiers. For example, table 300 shows a column of agent identifiers #1 to # N and a separate column of user identifiers #1 to # N. The user identifiers and the agent identifiers may be stored in a same row of the table to associate the user identifier and the agent identifier. Although table 300 is shown in FIG. 3, the user identifiers may be associated with the agent identifiers in a database using other database association techniques, such as by using a marker, object, or some other indicator associating the user identifier to an agent identifier stored in the database.

The integration system 102 may receive a request to access information from one of the user device 108 or the agent device 112. In one example, the user, via the user device 108, may request to view user information stored in the user-information database 118. The integration system 102 may receive the request and identify the appropriate information to display to the user based on a user identifier 302 stored in the user-information database 118 and corresponding to the user of the user device 108. In some aspects, the user identifier 302 may be determined by the integration system 102 in response to receiving authentication information stored as user information in the database 118. The user identifier 302 may be associated to both secure user information 304 and unsecured user information 306 associated with the user identifier 302 in the user-information database 118. The integration system 102 may retrieve the secure user information 304 or the unsecured user information 306 and generate one or more user interfaces including the information. The integration system 102 may transmit the user interfaces to the user device 108 to present the requested user information to the user.

In some aspects, the user identification information may include a unique set of alphanumeric characters or other references operating as a user identifier corresponding to an identity of the user. For example, the user identifier may include an online banking ("OLB") number assigned to distinguish each holder of an account provided by the provider. In other examples, the user identifier may be provided by the user, such as a social security number or driver's license number of the user. In some aspects, the secure user information 304 may include account information associated with accounts provided by a provider hosting the integration system 102. In one example, the account information may include account numbers, balance information, transaction information, and an account type associated with the account (e.g., checking, savings, money markets, IRA, mortgage, etc.). In some aspects, the secure user information 304 may also include authentication information used to authenticate the user to view the account information. The authentication information may include user names, passwords, answers to security questions, etc. that are unique to authenticate the user to view the secure user information 120. Authentication information may be received from a user via the user device 108 and compared with authentication information stored in the database 118 for a match to authenticate the user. The authentication information may be associated, or linked, to the user identifier to identify the user and correct secure user information 120 corresponding to the authentication information. The unsecured user information 306 may include geographical information of the user. The geographical information may include a physical location associated with the user. For example, the geographical information may include an address corresponding to the user's residence, the user's mailing address, or a retail location or branch of the provider in which the user has previously performed a transaction associated with an account (e.g., the location where the user opened the account, the location where the user withdrew funds from a checking account, etc.). In some aspects, the physical location may be represented in the database by a set of coordinates.

In another example, an agent, via the agent device 112, may request to view user information stored in the provider-information database 122. The integration system 102 may receive the request and identify the appropriate information to display to the agent based on an agent identifier 308 stored in the provider-information database 122 and corresponding to the agent. In some aspects, the agent identifier 308 may correspond to an employee identification number or some other unique identifier of the agent. The agent identifier 308 is associated with both secure agent information 310 and unsecured agent information 312 in the database 122. The integration system 102 may use the agent identifier 308 to retrieve the requested agent information and generate one or more user interfaces including the agent information. The integration system 102 may transmit the user interfaces to the agent device 112 for presenting to the agent.

In some aspects, the secure agent information 310 may include availability information corresponding to times in which each agent is available or unavailable. In some aspects, the secure agent information 310 may be used by personal information management ("PIM") software, such as Microsoft Outlook®, that allows each agent to maintain a calendar corresponding to the user's availability from the agent device 112 via the network 110 of FIG. 1. In some aspects, the provider-information database 122 may also include or be communicatively coupled to a mail server and include email information as secure agent information 310. The unsecured agent information 312 may include profile information corresponding to agents of the provider. For example, the agent information may include agent names, agent contact information or geographical information, job titles, geographical locations associated with a branch of the provider in which the agent is located, specialized skills, etc. In some aspects, the agent information 124 may also include photographs of the agents accessible by an agent directory.

In another example, the user may request to view secure agent information 310. In response to such a request, the integration system 102 may determine the user identifier 302 associated with the user (e.g., by authenticating the user). The integration system 102 may execute a search of the table for the user identifier 302 to determine if the user is linked to an agent via an associating between the user identifier and an agent identifier stored in the table 300. For example, the user identifier 32 may correspond to user identifier #1 stored in the table 300. The integration system 102 may determine the agent for whom the user is authorized to view secure agent information 310 based on the agent identifier #1 associated with the user identifier #1 in the table 300. The presence of an association between a user identifier and an agent identifier may operate as a flag to enable the user access by the integration system 102 to at least a portion of the secure agent information 310 stored in the provider-information database 122. The integration system 102 may retrieve the agent identifier #1, search the provider-information database 122 for the agent identifier 308 matching the agent identifier #1, and retrieve secure agent information 310 associated with the matching agent identifier 308 in the database 122. The integration system 102 may generate user interfaces including the requested secure agent information 310 and transmit them to the user device 108 for display to the user.

The agent corresponding to the agent identifier #1 may similarly access secure user information 304 in the user-information database 118. For example, the integration system 102 may receive a request to view the secure user information 304 from the agent device 112. The integration system 102 may search the table 300 to determine a user identifier associated with the agent identifier corresponding to the agent. The presence of an association between a user identifier and an agent identifier may operate as a flag to enable the agent access by the integration system 102 to at least a portion of the secure user information 304 stored in the user-information database 116. The integration system 102 may then retrieve the associated user identifier (e.g., user identifier #1) and search the user-information database 118 for the user identifier 302 matching the user identifier retrieved from the table 300. The integration system 102 may retrieve secure user information 304 associated with the matching user identifier 302 in the user-information database 118 and generate user interfaces including the secure user information 304. The integration system 102 may transmit the user interfaces to the agent device 112 for display to the agent.

In some aspects, the agent may be associated with multiple users. For example, the table may include multiple instances of the agent identifier corresponding to the agent in the table 300, each being associated with a different user identifier. Similarly, the user may be associated with multiple agents. For example, the table may include multiple instances of the user identifier corresponding to the user, each being associated with a different agent identifier. In additional and alternative aspects, the integration system 102 may establish an association between an agent and a user to authorize access to the other's secure information.

Figure 4:
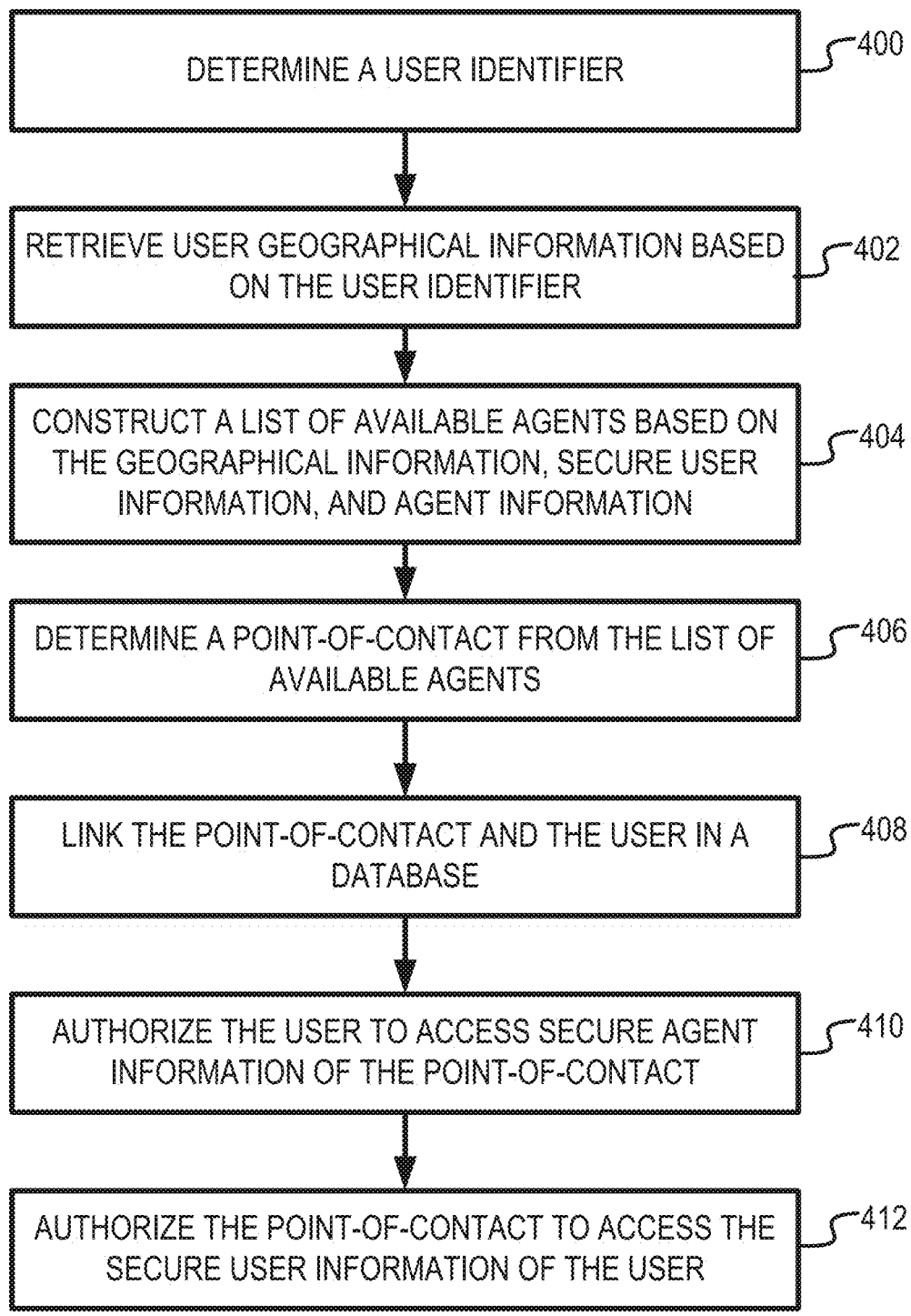
FIG. 4 is a flow chart of a process for authorizing access to secure information according to some aspects of the present disclosure.

FIG. 4 is a flow chart of a process for authorizing access to secure information according to some aspects of the present disclosure. The process is described with reference to the components of FIGS. 1-3, unless otherwise indicated, though other implementations are possible without departing from the scope of the present disclosure.

In block 400, a user identifier associated with user is determined. In some aspects, the integration engine 204 may cause the processor 200 to determine the user identifier by authenticating the user. For example, the integration system 102 may receive authentication information from the user entered on the user device 108 and transmitted to the integration system 102 via the network 110. The integration engine 204 may cause the processor 200 to compare the authentication information with authentication information stored in the database 118 of the user-information system 114. The stored authentication information may be associated with a user identifier in the database 118. The integration engine 204 may cause the processor 200 to determine a match between the authentication information received from the user device 108 and the stored authentication information in the database 118 and identify the user identifier associated with the matching authentication information stored in the database 118. In some aspects, the integration engine 204 may cause the processor 200 to retrieve a copy of the user identifier for storing in the table 300.

In block 402, user geographical information is retrieved based on the user identifier. The integration engine 204 may cause the processor 200 to retrieve the user geographical information by identifying the user identifier associated with the user geographical information in the database 118 of the user-information system 114. In some aspects, the user geographical information may be retrieved simultaneously with the user identifier. For example, the authentication information may be associated with the user geographical information in the database 118 indirectly through the user identifier associated with the authentication information. The integration engine 204 may cause the processor 200 to retrieve both the user identifier and the user geographical information associated with the user identifier in the same request. The integration engine 204 may retrieve geographical information associated with the user from the database 118 via the network 110 or an enterprise service bus.

In another example, the integration engine 204 may cause the processor 200 to compare the user identifier retrieved from the database 118, and stored in the database 104, with the user identifiers in the database 118 to determine a match. The user geographical information may be determined by identifying the user geographical information associated with the matching user identifier in the database 118.

In block 404, a list of available agents is constructed based on the geographical information, the secure user information 120, and the agent information 124. In some aspects, the geographical information may include a physical location associated with the user, and the integration engine 204 may cause the processor 200 to compare the user geographical information with provider geographical information stored in the database 122 of the provider-information system 116 to determine agents within the specified radius. The provider geographical location may correspond to a store, branch, or other retail location of the provider in which the agents work or are otherwise associated. In some aspects, the specified radius may include the geographical information corresponding to retail location closest to the physical location associated with the user. In other aspects, the specified radius may depend on a predetermined radius set by a user, an installer of the integration system 102 (e.g., a default or maximum distance), or other party. For example, the specified radius may depend on a default distance of 50 miles from the physical location associated with the user. In another example, the specified radius may include all retail locations within a maximum distance of 100 miles of the physical location associated with the user and may select the closest retail location having agents matching criteria for serving as a point-of-contact.

The integration engine 204 may also cause the processor 200 to retrieve agent information 124 from the database 122 of the provider-information system 116 and secure user information 120 from the database 118 of the user-information system 114. The agent information 124 may correspond to agents in an identified retail location based on the geographical location associated with the user. The agent information 124 may include job descriptions, job titles, specialized skills, or other criteria. The secure user information 120 may include account information, including an account type corresponding to the type of account held by the user. The integration engine 204 may cause the processor 200 to compare the account type to the agent information 124 to the list of agents at a retail location of the provider to filter the list of agents to determine an agent eligible as a point-of-contact. In one example, the account type may correspond to a money market account held by the user. The processor 200 may determine agents at the retail location having a job title compatible with this type of account (e.g., a money market accountant, an account relationship manager, etc.) or an agent having special skills or experience with money market accounts.

In block 406, a point-of-contact is determined from the list of available agents. In some aspects, the integration engine 204 may include instructions to identify the point-of-contact from the available agents by considering one or more factors associated with the agents in the list. In some aspects, the instructions may include logic that may be applied using the factors. The factors may include, but are not limited to: (1) least recently selected as a point-of-contact; (2) the number of users to which the agent has been assigned as a point-of-contact; (3) whether the provider has opted in or opted out of being assigned as a point-of-contact; (4) seniority; (5) or recorded previous interactions between an agent on the list and the user. In some aspects, the factors may be weighted or prioritized to narrow the available agents to a single point-of-contact. For example, the list may be narrowed by prioritizing an agent having a previous interaction with the user. If more than one agent on the list has had previous interactions with the user, another factor may be considered to further narrow the list (e.g., the agent having the least number of users assigned to the agent). In additional or alternative aspects, all or a portion of the determination of the point-of-contact may be performed by applying a randomization algorithm (e.g., identifying the point-of-contact randomly from the list of available agents).

In block 408, the point-of-contact and the user are linked in the database 104. In some aspects, the point-of-contact and the user may be linked by storing the user identifier corresponding to the user and the agent identifier corresponding to the point-of-contact in a database (e.g., database 104) in a manner that associates the user identifier and the agent identifier (e.g., table 300, an object, a marker, etc.).

In block 410, the user may be authorized to access secure agent information associated with the point-of-contact. In some aspects, the integration engine 204 may also cause the processor 200 to generate one or more user interfaces that allow the user to access the secure agent information. In some aspects, the secure agent information may correspond to availability information of the user for an interaction with the user. The agent may be able to access the secure agent information from the agent device 112 via the network, separate from the integration system 102. The user may only be able to access the secure agent information from the user device 108 subsequent to the user and the agent being linked by the integration system 102 as described in FIG. 3.

Figure 5:
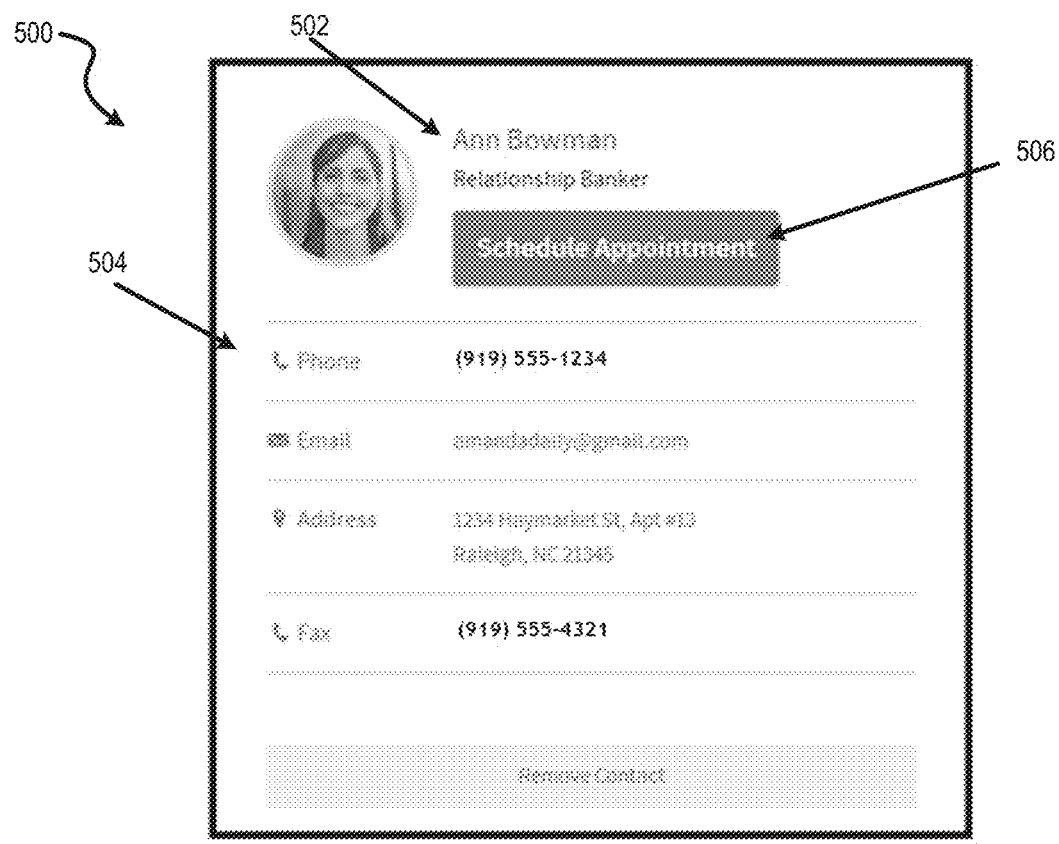
FIG. 5 is an example of a user interface displaying contact information for a point-of-contact according to some aspects of the present disclosure.

FIG. 5 is an example of a user interface 500 displaying information for a point-of-contact according to some aspects of the present disclosure. In some aspects, the integration engine 204 may cause the processor to generate the user interface and transmit the user interface to the user device 108 via the network 110 for display on a display unit of the user device 108. The user interface 500 includes identifying information 502 of the point-of-contact (e.g., a name and a job title). In some aspects, the identifying information 502 may be retrieved from the database 122 of the provider-information system 116 by the processor 200 for generating the user interface 500. The user interface 500 also includes contact information 504 to allow the user to contact the point-of-contact directly. The contact information 504 may be retrieved from database 122. The user interface 500 may also include a selection option 506 that may be selected by the user via the user device 108 to generate a request signal corresponding to a request to modify the secure agent information (e.g., the availability information) of the point-of-contact in the database 122. In response to receiving the request signal, the integration engine 204 may cause the processor 200 to generate one or more additional user interfaces to allow the user to access and modify the availability information for the point-of-contact.

Returning to FIG. 4, in block 412, the point-of-contact may be authorized to access secure user information 120 associated with the user. In some aspects, the integration engine 204 may also cause the processor 200 to generate one or more user interfaces that allow the agent to access the secure user information 120 from the agent device 112. In some aspects, the secure user information 120 may correspond to account information, such as balances, transaction histories, and other information corresponding to one or more accounts held by the user. The account information may allow the point-of-contact to assist the user in managing the account. The user may be able to access the secure user information 120 from the user device 108 via the network 110, separate from the integration system 102. In some aspects, the agent may only be able to directly access the secure user information 120 from the agent device 112 subsequent to the user and the agent being linked by the integration system 102 as described in FIG. 3.

Figure 6:
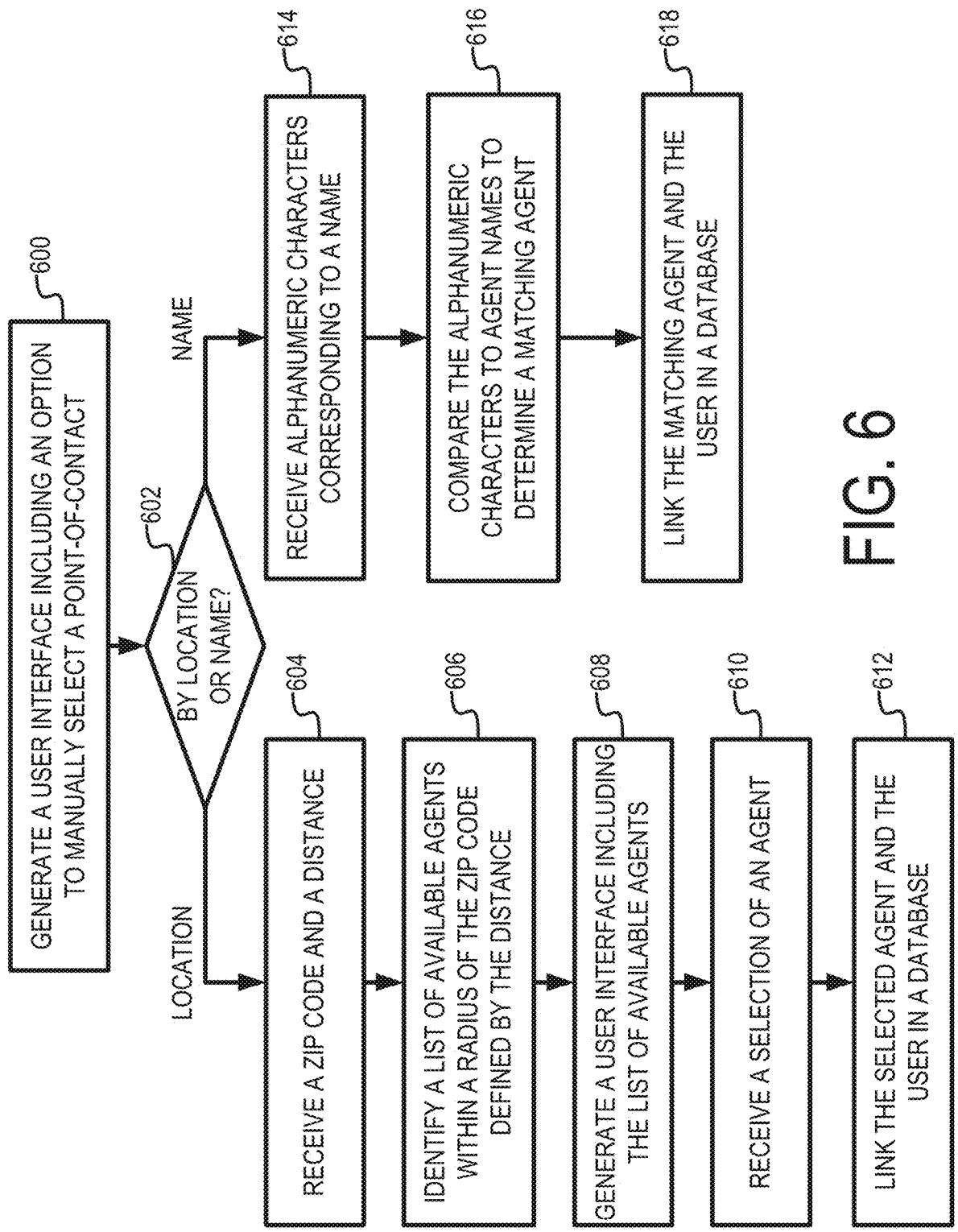
FIG. 6 is a flow chart of a process for selecting a point-of-contact according to aspects of the present disclosure.

FIG. 6 is a flow chart of a process for selecting an agent as a point-of-contact according to aspects of the present disclosure. The process is described with reference to the components of FIGS. 1-3, unless otherwise indicated, though other implementations are possible without departing from the scope of the present disclosure.

In block 600, a user interface is generated including an option to select an agent. In some aspects, an agent may be manually selected only after an initial point-of-contact is established by the integration system 102. In other aspects, the integration system 102 may allow the user to select the agent as the initial point-of-contact. In some aspects, the user interface may include an input option to allow a user to input a name of an agent. In additional and alternative aspects, the user interface may include an input option to allow the user to input location information corresponding to an agent.

Figure 7:
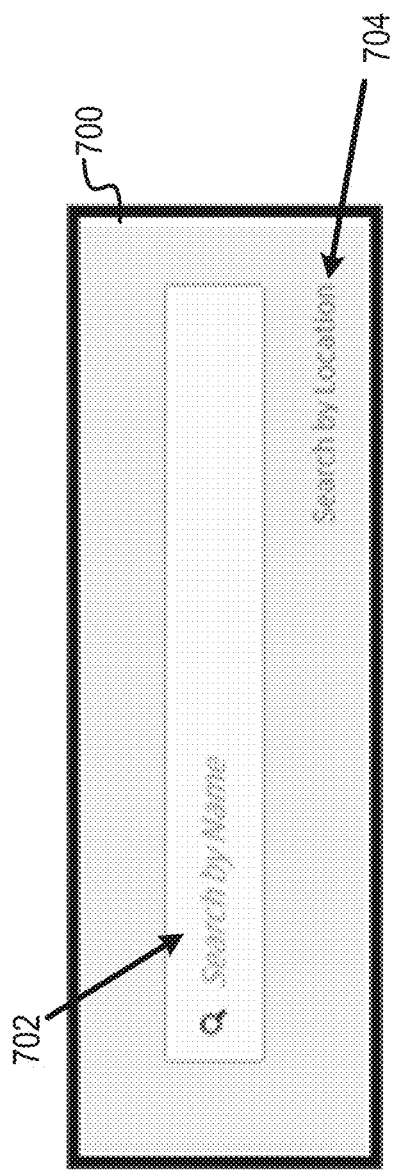
FIG. 7 is an example of a user interface for searching for a point-of-contact by name according to some aspects of the present disclosure.
Figure 8:
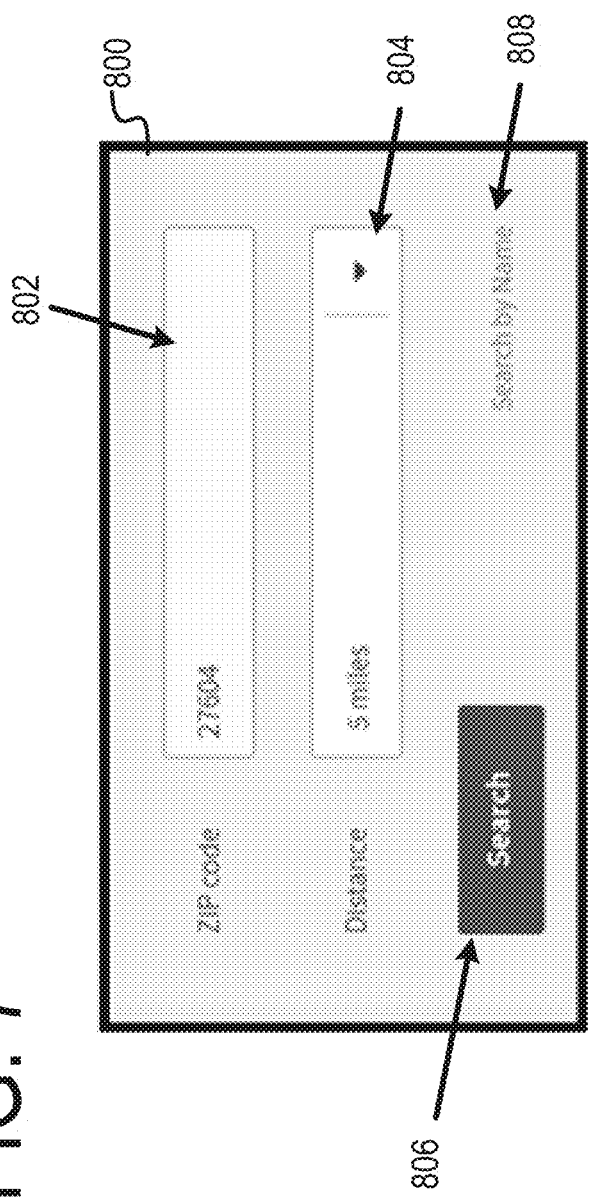
FIG. 8 is an example of a user interface for searching for a point-of-contact by location according to some aspects of the present disclosure.

FIGS. 7 and 8 illustrate examples of user interfaces 700, 800, respectively, for manually searching for a point-of-contact according to some aspects of the present disclosure.

In FIG. 7, user interface 700 includes an input option 702 that may be used to manually search for an agent as a point-of-contact by name. The input option 702 may allow the user to enter alphanumeric characters using a keyboard or other input device of the user device 108. In response to a selection of an "enter" or "return" key on the keyboard of the user device 108, the user device 108 may transmit the inputted characters to the integration system 102. In some aspects, the user interface 700 may include an additional selection option to transmit the inputted characters to the integration system 102. The user interface 700 also includes a selection option 704 (e.g., a hyperlink) that may be selected to generate a user interface that allows the user to manually search for an agent by location. In response to a selection of the selection option 704, a signal may be transmitted via the network 110 to the integration system 102. The integration engine 204 may cause the processor 200 to generate a user interface and transmit the user interface to the user device 108 via the network 110 to allow the user to search for an agent by location.

In FIG. 8, a user interface 800 includes an input option 802 that may be used to manually search for an agent as a point-of-contact by location. The input option 802 may allow the user to enter alphanumeric characters corresponding to a zip code or other location identifier using a keyboard or other input device of the user device 108. The user interface 800 also includes a selection option 804 (e.g., a scroll-down menu) that allows the user to select a distance using a mouse, touchscreen, or other selection tool of the user device 108. In other aspects, the user interface 800 may include an input option to allow the user to input a distance. The user device 108 may transmit the zip code, or other location identifier, and the distance from the input option 802 and the selection option 804 to the integration system 102 by selecting the selection option 806. In response to selecting the selection option 806, a signal may be transmitted to the integration system 102 corresponding to the location identifier and the distance provided by the user via the user device 108.

The user interface 800 also includes a selection option 808 (e.g., a hyperlink) that may be selected to generate a user interface that allows the user to manually search for an agent by name. In response to a selection of the selection option 808, a signal may be transmitted via the network 110 to the integration system 102. The integration engine 204 may cause the processor 200 to generate a user interface, such as user interface 700 of FIG. 7, and transmit the user interface to the user device 108 via the network 110 to allow the user to search for an agent by location.

Returning to FIG. 6, in block 602, the integration system 102 may determine whether the manual search is by location or name depending on the user interface from which the request is received. For example, if the request is received from the user interface 700 of FIG. 7, the integration system 102 may determine that the request is to manually search for an agent by name. If the request is received from the user interface 800 of FIG. 8, the integration system 102 may determine that the request is to manually search for an agent by location. In other aspects, the integration system 102 may determine whether the manual search is by location or name depending on the information received from the user device 108 in response to the user input.

In block 604, a zip code and the distance are received to search for an agent by location. In some aspects, the zip code and the distance may be received by the integration system 102 in the form of a signal transmitted to the integration system 102 from the user device 108 via the network based on input from the user interface 800 of FIG. 8.

In block 606, a list of available agents within a radius of the zip code is identified. The radius is determined by the distance received in block 604. In some aspects, the integration system 102 may determine the retail locations of the provider located within a geographical boundary defined by the radius around the zip code. The retail locations may be stored in the database 122 of the provider-information system 116 and compared to the zip code to determine whether they are within the geographical boundary. The agents associated with the retail locations within the geographical boundary may be used to populate the list. In some aspects, the list may be populated by the integration system 102 using the instructions described in block 404 of FIG. 4. In other aspects, one or more of the parameters used to populate the list of available agents in block 404 may be excluded by the integration system 102 when populating the list of available agents in block 606 of FIG. 6. For example, the integration system 102 may populate the list of available agents based on the geographical information and the agent information, such as job description and job title, but may not consider secure user information in populating the list.

In block 608, a user interface is generated including the list of available agents. The user interface may be generated by the processor 200 and may include one or more selection options for the user to select an agent as a point-of-contact using a selection tool of the user device 108.

Figure 9:
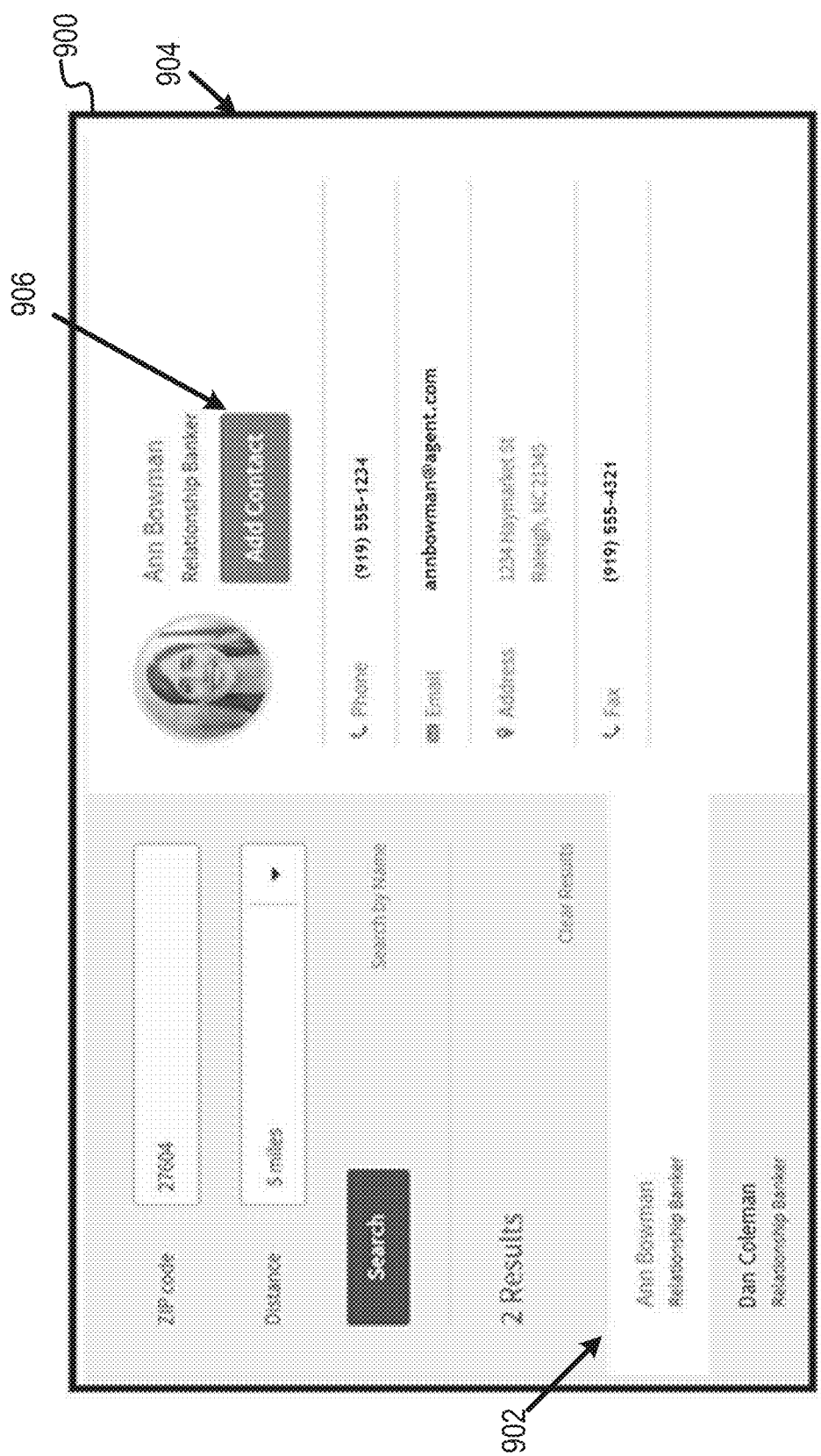
FIG. 9 is an example of a user interface for selecting a point-of-contact according to some aspects of the present disclosure.

FIG. 9 is an example of a user interface 900 for selecting a point-of-contact according to some aspects of the present disclosure. The user interface 900 includes a list 902 including agents available for selection as a point-of-contact. The user interface 900 also includes region 904 that displays contact information for the agents in the list. For example, each of the agents included in a list may include selection options that cause the user interface 900 to display information about the selected agent in the region 904. The user interface 900 also includes a selection option 906 that may be selected by the user to select an agent from the list as a point-of-contact. In response to a selection of the selection option 906, the user device 108 may transmit a signal via the network 110 to the integration system 102 corresponding to the selected agent.

Returning to FIG. 6, in block 610, the selection of an agent from the list generated in block 606 is received. In some aspects, the selection may be received as a signal corresponding to the agent selected from the user interface 900 of FIG. 9 using the selection option 906. In block 612, the selected agent and the user are linked by associating an agent identifier corresponding to the selected agent and the user identifier in the database 104. Although the search by location steps described in blocks 604-612 described searching for an agent using a zip code, the search may be performed by other location identifiers without departing from the scope of the present disclosure. For example, the user interface 800 of FIG. 8 may be modified to include a city, state, landmark, or other identifier of a location that may be used to search for the agent.

In block 614, alphanumeric characters corresponding to a name are received, indicating that the user desires to search for a point-of-contact by name. In some aspects, the alphanumeric characters may be received in the form of a signal generated subsequent to an input of a name in the input option 702 of FIG. 7.

In block 616, the alphanumeric characters are compared to agent names stored in the database 122 of the provider-information system 116 to determine a match. In some aspects, the integration engine 204 may include a matching algorithm may cause the processor 200 to compare the alphanumeric characters to determine if a name of an agent stored as agent information 124 in the database 122 has the same alphanumeric characters. In some aspects, where there are multiple agents matching, the integration engine 204 may cause the processor 200 to generate a list of matching agents, display the user interface to the user via the user device 108, and receive a selection of an agent from the list as described in blocks 608 and 610. In block 618, the matching agent and the user may be linked by associating an agent identifier corresponding to the matching agent and the user identifier in the database 104.

Figure 10:
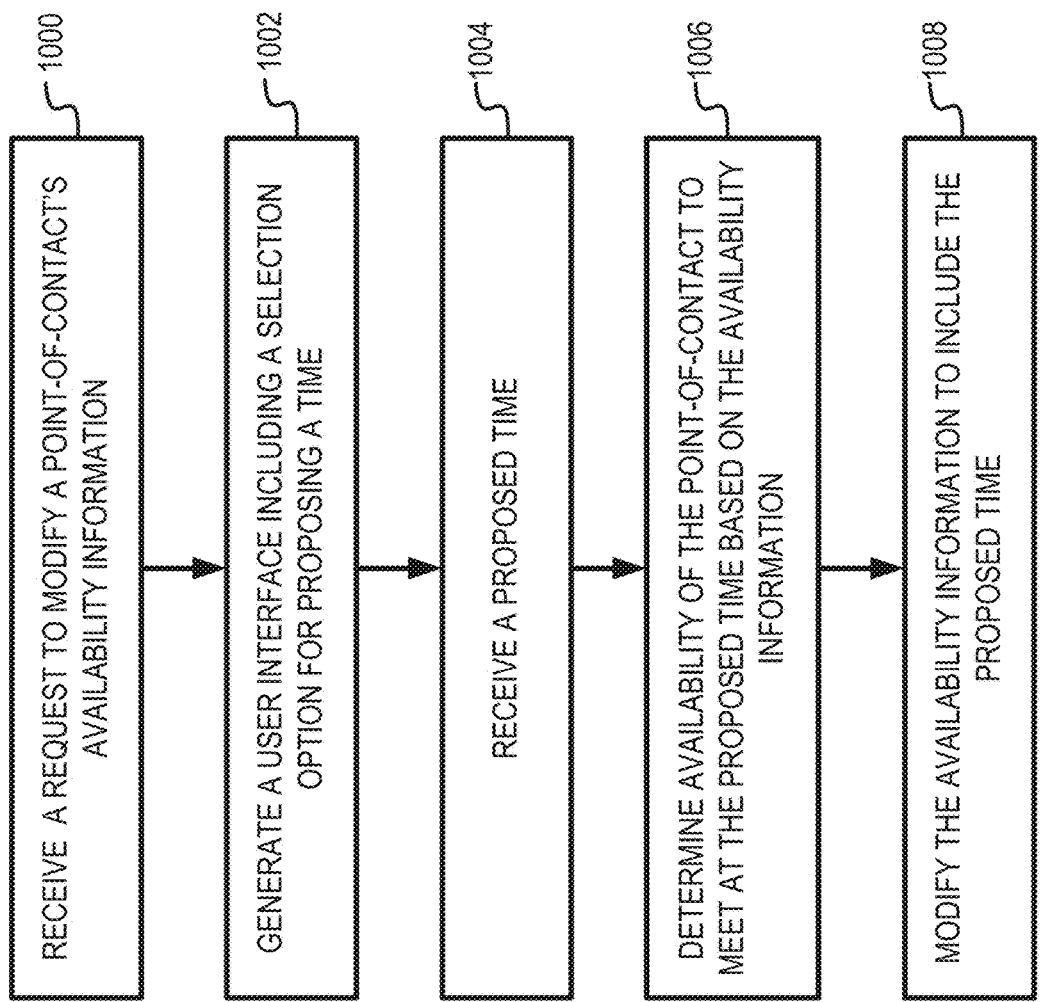
FIG. 10 is a flow chart of a process for scheduling an interaction between a user and a point-of-contact according to some aspects of the present disclosure.

FIG. 10 is a flow chart of a process for scheduling an interaction between a user and a point-of-contact according to some aspects of the present disclosure.

In block 1000, a request to modify availability information for a point-of-contact is received. In some aspects, the request may be received by the integration system 102 from the user device 108 in the form of a signal transmitted via the network 110. For example, the signal may be generated and transmitted to the integration system 102 in response to a user selection of the selection option 506 of FIG. 5.

In block 1002, a user interface including a selection option for proposing a time is generated. In some aspects, the integration engine 204 may cause the processor 200 to generate a user interface in response to receiving a signal corresponding to a request to modify the availability information of the point-of-contact in block 1000. In other aspects, one or more intermediate user interfaces may be generated to determine the type of meeting for which the availability information should be modified.

In block 1004, a proposed time is received. In some aspects, the proposed time is received in the form of a signal generated and transmitted by the user device 108 in response to user input via a selection option or input option of the user interface generated in block 1002. In additional and alternative aspects, the user interface of block 1002 may include options that cause the processor 200 to modify the user interface or generate additional interfaces to select a specific time.

In block 1006, availability of the point-of-contact to meet at the proposed time may be determined based on the availability information. The integration engine 204 may cause the processor to compare the proposed time to the availability information stored in the database 122 of the provider-information system 116 to determine if the proposed time is included as an available time to meet. In some aspects, the availability information may include a list of meetings or other appointments indicating when the agent is unavailable. In additional aspects, the times when the agent is unavailable may also include other factors specific to the retail location of the agent, such as daily traffic trends (e.g., how busy the branch or office may be at certain times of the day). For example, high-traffic dates such as standard paydays (e.g., the first day of each month) may be listed as unavailable for a meeting. In other aspects, the availability information may include both available times and unavailable times and markers or other indicators identifying whether the agent is available during each time. The proposed time may be identified in the availability information to determine whether it is indicated as an available time or an unavailable time.

In block 1008, the available information is modified to indicate that the proposed time is unavailable in response to the processor 200 determining that the proposed time was previously available for an interaction with the user.

Figure 11:
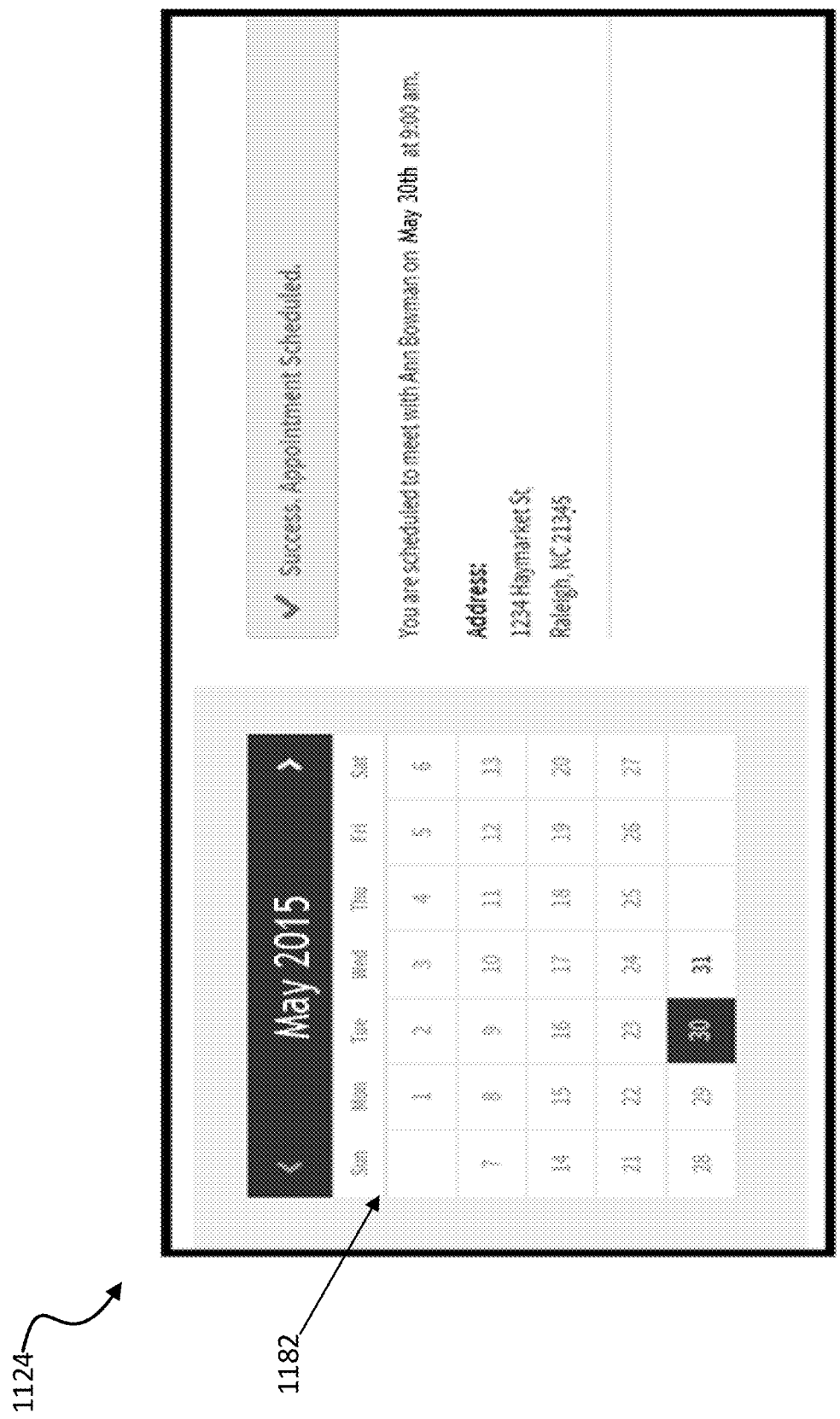
FIG. 11 is an example of a user interface for scheduling a telephonic interaction according to some aspects of the present disclosure.
Figure 12:
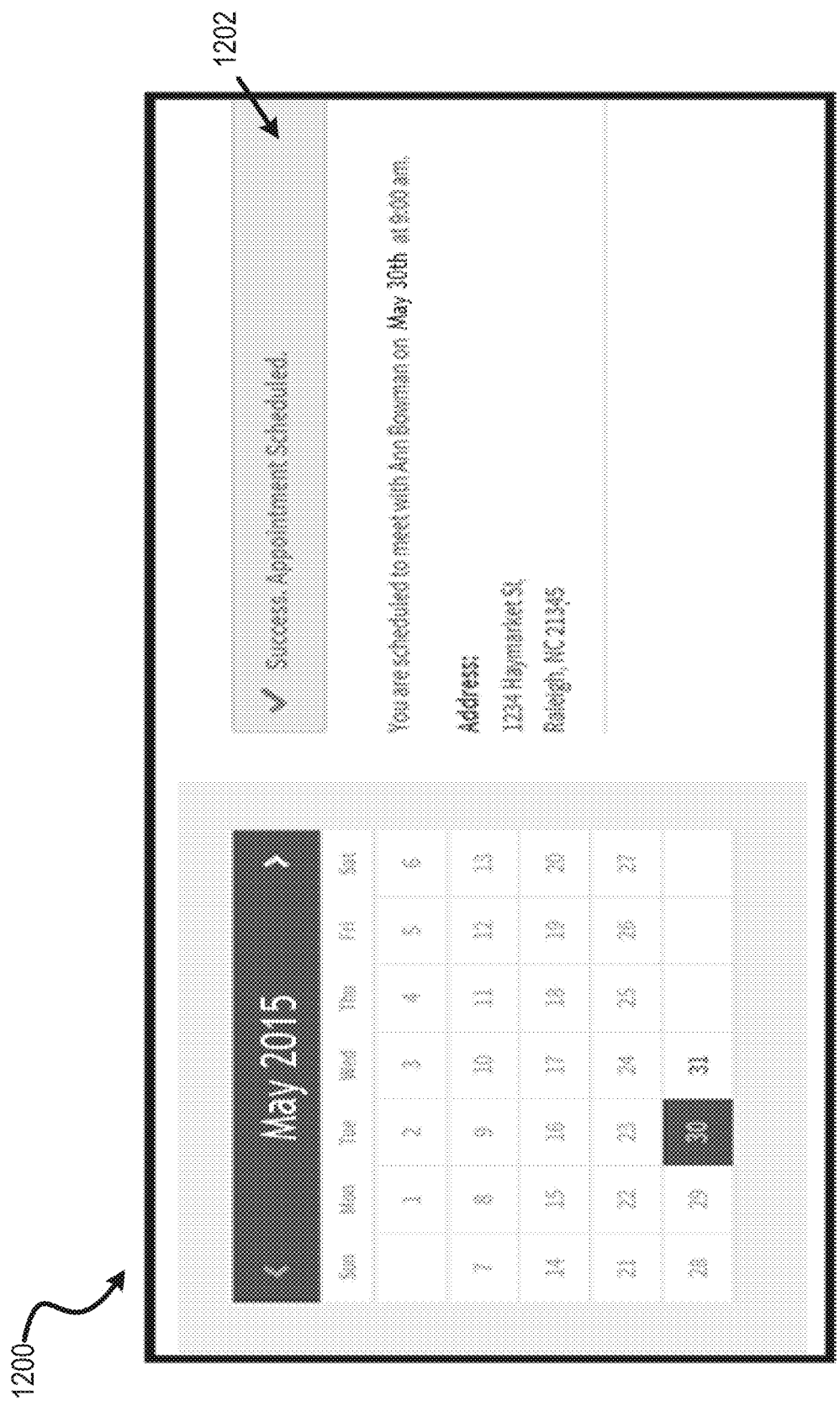
FIG. 12 is an example of a user interface for scheduling an in-person interaction according to some aspects of the present disclosure.

FIGS. 11 and 12 are examples of user interfaces 1124, 1200, respectively for scheduling an interaction between a user and a point-of-contact according to some aspects of the present disclosure. FIG. 11 shows user interface 1124 for scheduling a telephonic interaction. The user interface 1124 includes a calendar 1182. The calendar 1182 includes selection options corresponding to days that the user is available. For example, the user may select May 30 using a selection tool of the user device 108 to propose a time for an interaction on May 30. In some aspects, in response to the user selection of May 30, additional user interfaces may be generated by the processor 200 to allow the user to propose a time. If the proposed time is available to the user, the integration system 102 may modify the availability information of the point-of-contact to reserve the time for a meeting. The user interface 1124 displays a confirmation of the interaction to confirm that the availability information has been modified. In FIG. 11, the confirmation shows that the interaction corresponding to a telephonic appointment between the user and the point-of-contact. FIG. 12 is an example of a user interface 1200 for scheduling an in-person interaction according to some aspects of the present disclosure. The user interface 1200 includes a calendar for scheduling the appointment similar to the calendar 1182 of FIG. 11. Subsequent to the integration system 102 modifying the availability information of the point-of-contact to include the proposed time for the interaction, user interface 1200 displays a confirmation 1202 indicating the availability information is modified and including an address for an in-person interaction between the user and the point-of-contact. In some aspects, additional interaction types may be scheduled, including, but not limited to, network-based interactions (e.g., web-based videoconferences, online meetings, etc.).

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. An integration system, comprising:
   a processor communicatively coupled to a plurality of databases comprising at least a first database and a second database, wherein the first database includes financial information related to a financial account held by a user and a user identifier for the user, and wherein the second database includes secure agent information for agents of a provider of the financial account and agent identifiers uniquely identifying the agents;
   a memory accessible to the processor and including instructions executable by the processor to cause the processor to:
   determine a point-of-contact for the user by:
     determining an account type of the financial account held by the user;
     constructing a list of agents within a threshold radius of a physical location associated with the user by:
       retrieving user geographical information indicating the physical location associated with the user;
       retrieving agent geographical information associated with the agent identifiers in the second database, and
       comparing the user geographical information to the agent geographical information to determine the list of agents within the threshold radius of the physical location;
     filtering the list of agents to generate a list of available agents that are eligible to be the point-of-contact, wherein the filtering comprises analyzing job descriptions for the agents in the list of agents based on the account type of the financial account held by the user to determine a subset of the list of agents having job descriptions that are compatible with the account type of the financial account held by the user, the subset being the list of available agents;
     receiving a selection from the user of the point-of-contact from the list of available agents; and
     storing an association in a database between (i) an agent identifier corresponding to the point-of-contact and (ii) the user identifier corresponding to the user, the association being configured to link the user to the point-of-contact; and
   subsequent to storing the association in the database:
     receive a request from the user to access the secure agent information in the second database;
     in response to receiving the request, retrieve the agent identifier for the point-of-contact from database based on the stored association between the agent identifier and the user identifier in the database;
     search for the agent identifier in the second database to identify a portion of the secure agent information that is related to the point-of-contact in the second database; and
     provide the portion of the secure agent information related to the point-of-contact to the user.

2. The integration system of claim 1, wherein the user geographical information includes a retail location of the provider at which the user has previously conducted a financial transaction using the financial account, and wherein the memory includes instructions executable by the processor to cause the processor to identify the retail location by retrieving account information associated with the user from the first database, the account information including transaction history information corresponding to the financial transaction.

3. The integration system of claim 1, wherein the memory includes additional instructions executable by the processor to cause the processor to determine the user identifier by:

receiving, via a network, authentication information from a user device;

comparing the authentication information to stored authentication information stored in the first database; and identifying the user identifier associated with the stored authentication information in the first database.

4. The integration system of claim 1, wherein the memory includes additional instructions executable by the processor to cause the processor to:

receive a second request from the point-of-contact to access the financial information related to the financial account held by the user; and in response to the second request:
retrieve the user identifier corresponding to the user from the database based on the stored association between the agent identifier and the user identifier in the database;
search for the user identifier in the first database to identify the financial information related to the financial account held by the user requested by the point-of-contact; and
provide the financial information to the point-of-contact.

5. The integration system of claim 1, wherein the memory includes instructions executable by the processor to cause the processor to receive the selection of the point-of-contact from the list of available agents by:

determining how many times each respective agent in the list of available agents is represented in the database; and
selecting whichever agent from the list of available agents is represented in the database the fewest number of times as the point-of-contact.

6. The integration system of claim 1, wherein the secure agent information includes availability information for the point-of-contact, wherein the memory includes additional instructions executable by the processor to cause the processor to generate a first user interface displayable on a user device and including contact information for the point-of-contact and a first selection option selectable by the user to generate a selection signal and transmit the selection signal to the integration system via a network, the selection signal corresponding to a request to modify the availability information for the point-of-contact.

7. The integration system of claim 6, wherein the memory includes additional instructions executable by the processor to cause the processor to:

generate a second user interface in response to receiving the selection signal, the second user interface displayable on the user device and including a calendar usable to schedule a meeting between the user and the point-of-contact;
receive, from the user device, a second selection signal corresponding to a proposed time for the meeting;
determine an availability of the point-of-contact to meet with the user at the proposed time using the availability information for the point-of-contact; and
modify the availability information to include the proposed time subsequent to determining that the point-of-contact is available to meet with the user at the proposed time,
wherein the meeting corresponds to one of an in-person meeting or a telephonic meeting.

8. The integration system of claim 1, wherein the memory includes additional instructions executable by the processor to cause the processor to allow the user to manually select a second point-of-contact by:

generating a first user interface displayable on a user device and including an input option and a selection option;
receiving, from the user device, an input signal corresponding to a location identifier inputted into the input option by the user via the user device and a selection of a distance selected from the selection option by the user via the user device;
identifying a second list of available agents within a radius of the location identifier by comparing the location identifier with the agent geographical information, the radius being defined by the distance selected by the user;
generating a second user interface displayable on the user device and including additional selection options corresponding to each agent in the second list of available agents;
receiving a second selection signal from the user device corresponding to a second selection of one selection option of the additional selection options, the one selection option corresponding to a selected agent in the second list of available agents; and
storing another association in the database between the user identifier and a selected agent identifier corresponding to the selected agent.

9. A method, comprising:

receiving, by a processor of an integration system, authentication information from a user device via a network;
determining, by the processor, a user identifier associated with the authentication information in a first database communicatively coupled to the processor, the user identifier corresponding to a user of the user device;
retrieving, by the processor, user geographical information indicating a physical location associated with the user;
determining, by the processor, an account type of a financial account held by the user;
retrieving, by the processor, agent geographical information associated with agent identifiers in a second database, the agent identifiers uniquely identifying agents of a provider of the financial account held by the user;
determining, by the processor, a point-of-contact for the user by:
comparing the user geographical information to the agent geographical information to determine a list of agents within a threshold radius of the physical location associated with the user;
filtering the list of agents to generate a list of available agents that are eligible to be the point-of-contact, wherein the filtering comprises analyzing job descriptions for the agents in the list of agents based on the account type of the financial account held by the user to determine a subset of the list of agents having job descriptions that are compatible with the account type of the financial account held by the user, the subset being the list of available agents;
receiving a selection from the user of the point-of-contact from the list of available agents; and
storing an association in a database between (i) an agent identifier corresponding to the point-of-contact and (ii) the user identifier corresponding to the user, the association being configured to link the user to the point-of-contact; and subsequent to storing the association in the database:
receiving, by the processor, a request from the user to access secure agent information;
in response to receiving the request, retrieving, by the processor, the agent identifier for the point-of-contact from database based on the stored association between the agent identifier and the user identifier in the database;
searching, by the processor, for the agent identifier in the second database to identify the secure agent information requested by the user, the secure agent information corresponding to the point-of-contact; and
providing, by the processor, the secure agent information corresponding to the point-of-contact to the user.

10. The method of claim 9, wherein the physical location corresponds to a retail location of a provider at which the user has previously conducted a financial transaction using the financial account.

11. The method of claim 9, wherein determining the user identifier includes:
comparing the authentication information to stored authentication information stored in the first database; and
identifying the user identifier associated with the stored authentication information in the first database.

12. The method of claim 9, further comprising:
receiving a second request from the point-of-contact to access financial information related to the financial account held by the user; and
in response to the second request:
retrieving the user identifier corresponding to the user from the database based on the stored association between the agent identifier and the user identifier in the database;
searching for the user identifier in the first database to identify the financial information related to the financial account of the user requested by the point-of-contact; and
providing the financial information to the point-of-contact.

13. The method of claim 9, further comprising:
determining how many times each respective agent in the list of available agents is represented in the database; and
selecting whichever agent from the list of available agents is represented in the database the fewest number of times as the point-of-contact.

14. The method of claim 9, further comprising:
generating a first user interface displayable on the user device and including contact information for the point-of-contact and a first selection option selectable by the user to generate a selection signal and to transmit the selection signal to the processor via the network, the selection signal corresponding to a request to modify availability information for the point-of-contact,
wherein the secure agent information includes the availability information for the point-of-contact.

15. The method of claim 14, further comprising:
generating a second user interface in response to receiving the selection signal, the second user interface displayable on the user device and including a calendar usable to schedule a meeting between the user and the point-of-contact;
receiving, from the user device, a second selection signal corresponding to a proposed time for the meeting;
determining an availability of the point-of-contact to meet with the user at the proposed time using availability information for the point-of-contact; and
modifying the availability information to include the proposed time subsequent to determining that the point-of-contact is available to meet with the user at the proposed time.

16. The method of claim 9, further comprising:
generating a first user interface displayable on the user device and including an input option;
receiving, from the user device, an input signal corresponding to a name of a new agent inputted into the input option by the user via the user device;
comparing the name to a plurality of agent names stored in the second database to determine a matching agent; and
linking the user and the matching agent by associating, in the database, the user identifier and a matching agent identifier corresponding to the matching agent.

17. The method of claim 9, further comprising:
generating a first user interface displayable on the user device and including an input option and a selection option;
receiving, from the user device, an input signal corresponding to a location identifier inputted into the input option by the user via the user device and a selection of a distance selected from the selection option by the user via the user device;
identifying a second list of available agents within a radius of the location identifier by comparing the location identifier with the agent geographical information, the radius being defined by the distance selected by the user;
generating a second user interface displayable on the user device and including additional selection options corresponding to each agent in the second list of available agents;
receiving a second selection signal from the user device corresponding to a second selection of one selection option of the additional selection options, the one selection option corresponding to a selected agent in the second list of available agents; and
linking the user and the selected agent by associating, in the database, the user identifier and a selected agent identifier corresponding to the selected agent.

18. A non-transitory computer-readable medium comprising program code executable by a processor of an integration system to cause the processor to:
determine a point-of-contact for a user by:
retrieving account information from a first database, wherein the account information indicates an account type of a financial account held by the user;
constructing a list of agents within a threshold radius of a physical location of the user by:
retrieving user geographical information indicating the physical location associated with the user;
retrieving agent geographical information associated with agent identifiers in a second database, wherein the agent identifiers uniquely identify agents of a provider of the financial account held by the user; and
comparing the user geographical information to the agent geographical information to determine the list of agents within the threshold radius of the physical location;
filtering the list of agents to generate a list of available agents that are eligible to be the point-of-contact, wherein the filtering comprises analyzing job descriptions for the agents in the list of agents based on the account type of the financial account held by the user to determine a subset of the list of agents having job descriptions that are compatible with the account type of the financial account held by the user, the subset being the list of available agents; and receiving a selection from the user of the point-of-contact from the list of available agents;

store an association in a database between (i) an agent identifier corresponding to the point-of-contact (ii) a user identifier corresponding to the user; and subsequent to storing the association in the database:
 receive a request from the user to access secure agent information;
 in response to receiving the request, retrieve the agent identifier for the point-of-contact from the database based on the stored association between the agent identifier and the user identifier in the database;
 search for the agent identifier in the second database to identify the secure agent information in the second database, the secure agent information corresponding to the point-of-contact; and
 provide the secure agent information corresponding to the point-of-contact to the user.

19. The non-transitory computer-readable medium of claim 18, wherein the program code is further executable by the processor to cause the processor to:
 receive a second request from the point-of-contact to access financial information related to the financial account held by the user; and
 in response to the second request:
  retrieve the user identifier corresponding to the user from the database based on the stored association between the agent identifier and the user identifier in the database;
  search for the user identifier in the first database to identify the financial information related to the financial account held by the user requested by the point-of-contact; and
  provide the financial information to the point-of-contact.

20. The non-transitory computer-readable medium of claim 18, wherein the program code is further executable by the processor to cause the processor to:
 generate a first user interface displayable on a user device and including an input option and a selection option;
 receive, from the user device, an input signal corresponding to a location identifier inputted into the input option by the user via the user device and a selection of a distance selected from the selection option by the user via the user device;
 identify a second list of available agents within a radius of the location identifier by comparing the location identifier with the agent geographical information, the radius being defined by the distance selected by the user;
 generate a second user interface displayable on the user device and including additional selection options corresponding to each agent in the second list of available agents;
 receive a second selection signal from the user device corresponding to a second selection of one selection option of the additional selection options, the one selection option corresponding to a selected agent in the second list of available agents; and
 storing another association in the database between the user identifier and a selected agent identifier corresponding to the selected agent.

21. The integration system of claim 1, wherein the user identifier is different from the financial information, the financial information includes bank balance information, and the provider is a financial institution.

22. The integration system of claim 21, wherein the portion of the secure agent information related to the point-of-contact includes dates and times at which the point-of-contact is available for a meeting.

* * * * *